United States Patent
Liu et al.

(10) Patent No.: US 11,400,766 B2
(45) Date of Patent: Aug. 2, 2022

(54) CABLE BEAD AND TIRE

(71) Applicant: Jiangsu Xingda Steel Tyre Cord Co., Ltd., Jiangsu (CN)

(72) Inventors: Xiang Liu, Jiangsu (CN); Weigang Miao, Jiangsu (CN); Haidong Yao, Jiangsu (CN)

(73) Assignee: Jiangsu Xingda Steel Tyre Cord Co., Ltd.

( * ) Notice: Subject to any disclaimer, the term of this patent is extended or adjusted under 35 U.S.C. 154(b) by 128 days.

(21) Appl. No.: 16/766,209

(22) PCT Filed: Dec. 1, 2017

(86) PCT No.: PCT/CN2017/114159
§ 371 (c)(1),
(2) Date: May 21, 2020

(87) PCT Pub. No.: WO2019/100437
PCT Pub. Date: May 31, 2019

(65) Prior Publication Data
US 2020/0282777 A1    Sep. 10, 2020

(30) Foreign Application Priority Data
Nov. 27, 2017   (CN) .......................... 201711202063.5

(51) Int. Cl.
*B60C 15/04* (2006.01)
*D07B 1/06* (2006.01)

(52) U.S. Cl.
CPC ............ *B60C 15/04* (2013.01); *D07B 1/0606* (2013.01); *B60C 2015/046* (2013.01); *B60C 2015/048* (2013.01); *D07B 2201/2003* (2013.01)

(58) Field of Classification Search
CPC ........ B60C 2015/046; B60C 2015/048; D07B 1/0606; D07B 1/0633; D07B 2201/2003; D07B 2201/203; D07B 2201/2037
(Continued)

(56) References Cited

U.S. PATENT DOCUMENTS 2,050,298 A * 8/1936 Everett ................. B21C 37/047
139/387 R
2,106,060 A * 1/1938 Ostrander .............. H01B 7/226
174/108
(Continued)

FOREIGN PATENT DOCUMENTS

DE            1078475 B  *  3/1960 ........... D07B 1/0693
DE          3203503 A1 *  8/1983 ............... D07B 5/12
(Continued)

*Primary Examiner* — Khoa D Huynh
*Assistant Examiner* — Grace Huang

(57) ABSTRACT

Disclosed are a cable bead and a tire. The cable bead includes a core wire located at the middle position of the bead and at least one layer of outer winding wires wound around the core wire, each layer of outer winding wires being evenly wounded along the circumferential direction of the core wire, where the cross section of the outer winding wires is a flat surface having a major axis and a minor axis; the major axis is perpendicular to the radial direction of the cross section of the bead, and the minor axis is parallel to the radial direction of the cross section of the bead; the outer winding wires are in surface contact with the core wire; and when there are at least two layers of outer winding wires, a line contact is formed between the layers of outer winding wires.

11 Claims, 5 Drawing Sheets

(58) Field of Classification Search
USPC .......................................................... 57/212
See application file for complete search history.

(56) References Cited

U.S. PATENT DOCUMENTS

| | | | | |
|---|---|---|---|---|
| 3,079,460 | A * | 2/1963 | Grove | H01B 5/08 |
| | | | | 174/128.1 |
| 3,647,939 | A * | 3/1972 | Schoerner | D07B 1/147 |
| | | | | 174/128.1 |
| 3,691,751 | A * | 9/1972 | Hiller | D07B 1/08 |
| | | | | 57/215 |
| 3,784,732 | A * | 1/1974 | Whitfill, Jr. | D07B 5/12 |
| | | | | 174/108 |
| 4,349,063 | A * | 9/1982 | Kikuchi | B60C 9/0007 |
| | | | | 152/527 |
| 4,355,069 | A * | 10/1982 | Standley | B29C 48/022 |
| | | | | 428/301.4 |
| 4,543,298 | A * | 9/1985 | Riedl | D07B 1/062 |
| | | | | 428/592 |
| 4,677,033 | A * | 6/1987 | Coppens | C25D 3/58 |
| | | | | 152/565 |
| 4,807,680 | A * | 2/1989 | Weidenhaupt | B60C 9/005 |
| | | | | 57/902 |
| 5,429,878 | A * | 7/1995 | Bundo | B60C 9/0007 |
| | | | | 152/451 |
| 5,822,973 | A * | 10/1998 | Kaneko | D07B 1/0633 |
| | | | | 57/206 |
| 5,833,771 | A * | 11/1998 | Arnaud | C21D 8/065 |
| | | | | 148/325 |
| 6,302,175 | B1 * | 10/2001 | Shoyama | B60C 15/04 |
| | | | | 152/540 |
| 6,745,806 | B2 * | 6/2004 | Miyazaki | B60C 9/0007 |
| | | | | 152/451 |
| 7,089,724 | B2 * | 8/2006 | Black, III | D07B 1/0693 |
| | | | | 57/213 |
| 7,290,579 | B2 * | 11/2007 | Yamamoto | B60C 15/04 |
| | | | | 152/540 |
| 8,857,146 | B2 * | 10/2014 | Gauthier | D07B 1/0613 |
| | | | | 57/223 |
| 8,881,521 | B2 * | 11/2014 | Browne | D07B 1/0673 |
| | | | | 60/527 |
| 9,627,100 | B2 * | 4/2017 | Pourladian | D07B 1/147 |
| 10,266,009 | B2 * | 4/2019 | Lee | B60C 9/0042 |
| 10,309,041 | B2 * | 6/2019 | Suefuji | D07B 1/0613 |
| 10,994,573 | B2 * | 5/2021 | Delfino | B60C 9/1821 |
| 11,020,781 | B2 * | 6/2021 | Liu | C25D 5/10 |
| 11,186,947 | B2 * | 11/2021 | Vanreyten | F16G 1/12 |
| 2002/0134478 | A1 * | 9/2002 | Noferi | D07B 1/0633 |
| | | | | 152/451 |
| 2006/0266458 | A1 * | 11/2006 | Ishikawa | B60C 15/04 |
| | | | | 152/540 |
| 2012/0174557 | A1 * | 7/2012 | Boisseau | D07B 1/165 |
| | | | | 57/213 |
| 2012/0177940 | A1 * | 7/2012 | Cheng | B60C 9/0007 |
| | | | | 428/592 |
| 2012/0186715 | A1 * | 7/2012 | Toussain | B60C 9/0007 |
| | | | | 152/451 |
| 2012/0298403 | A1 * | 11/2012 | Johnson | H01B 5/105 |
| | | | | 174/130 |
| 2012/0312444 | A1 * | 12/2012 | Domingo | D02G 3/48 |
| | | | | 152/548 |
| 2014/0311120 | A1 * | 10/2014 | Pottier | D02G 3/48 |
| | | | | 57/232 |
| 2014/0311323 | A1 * | 10/2014 | Erlendsson | D07B 1/025 |
| | | | | 87/6 |
| 2015/0068655 | A1 * | 3/2015 | Jung | B60C 9/0057 |
| | | | | 152/451 |
| 2015/0174968 | A1 * | 6/2015 | Huyghe | D07B 1/062 |
| | | | | 152/540 |
| 2020/0338625 | A1 * | 10/2020 | Kageyama | B21F 17/00 |
| 2021/0180249 | A1 * | 6/2021 | Erlendsson | D07B 1/162 |
| 2021/0245843 | A1 * | 8/2021 | Zhu | B63B 21/20 |
| 2021/0354515 | A1 * | 11/2021 | Uemura | D07B 1/062 |

FOREIGN PATENT DOCUMENTS

| | | | | |
|---|---|---|---|---|
| DE | 3723720 | A1 * | 2/1988 | D07B 5/007 |
| EP | 0264071 | A2 * | 4/1988 | D07B 1/062 |
| EP | 1219746 | A1 * | 7/2002 | D07B 1/0633 |
| JP | 09228269 | A * | 9/1997 | D07B 1/0633 |

* cited by examiner

CABLE BEAD AND TIRE

FIELD

The present invention relates to the technical field of rubber products, and in particular, to a cable bead and a tire.

BACKGROUND

A tire generally consists of a crown, a sidewall, and a bead. The bead is hooped on a rim to provide a support point for a carcass and bear an outward expansion pressure of the carcass and a transverse acting force of the tire during turning. Therefore, the bead is required to have high strength, a tight and solid structure, stable and non-deformable performance, etc.

The cable bead is a bead with a circular cross section. The invention disclosed in Chinese utility model No. CN202071638U provides a special-shaped bead wire, having no sharp corner, not easy to form stress concentration, causing no cutting action to a carcass cord, and having a better protection function for the tire as compared with a hexagonal bead.

The invention disclosed in Chinese Patent No. CN104349916A provides a lighter hybrid bead wire.

The invention disclosed in Chinese Patent No. CN105415986A provides a cable bead with different strengths at different layers of outer winding wires for reducing weight and saving costs.

However, the outer winding wires of the cable bead in the prior art have circular cross sections. The arrangement gaps between wires of such a structure are relatively large, and the effective strength of the bead is not high. Moreover, the line contact is formed between the outer winding wires and the core wire. When there are at least two layers of outer winding wires, a point contact is easily formed between two adjacent layers of outer winding wires, so as to cause stress concentration under the action of stress and to shorten the service life of the bead.

SUMMARY

An objective of the present invention is to overcome defects in the prior art, and provides a cable bead and a tire, which can reduce an arrangement gap and the size of the cross section, improve the strength of the cross section, and reduce stress concentration in the bead, thereby prolonging the service life of the bead.

To solve the problem in the prior art, the present invention discloses a cable bead, including a core wire located at the middle position of the bead and at least one layer of outer winding wires wound around the core wire, each layer of outer winding wires being evenly wound along the circumferential direction of the core wire, where the cross section of each individual outer winding wire in each layer of the outer winding wires is a flat surface having a major axis and a minor axis; the major axis is perpendicular to the radial direction of the cross section of the bead, the minor axis is parallel to the radial direction of the cross section of the bead, and extension lines of all minor axes passing through the center of the outer winding wires on the outer winding wires are all converged at a point; the outer winding wires are in surface contact with the core wire; and there are at least two layers of outer winding wires, a line contact is formed between the at least two layers of outer winding wires.

The flat surface includes two parallel straight edges and two symmetrical arc edges respectively connected to two ends of the corresponding straight edge; the minor axis is a line segment corresponding to a vertical direction between the two straight edges; and the major axis is a line segment corresponding to the maximum distance between the two arc edges.

Preferably, a ratio Rax of the size of the major axis to the size of the minor axis is $1 < Rax \leq 2$.

Preferably, the ratio Rax of the size of the major axis to the size of the minor axis is $1.1 \leq Rax \leq 1.8$.

Preferably, the size of the major axis is 0.80-3.00 mm.

Preferably, the size of the major axis is 1.50-2.50 mm.

Preferably, when there are at least two layers of outer winding wires, the winding direction of each layer of outer winding wires is the same.

Preferably, when there are at least two layers of outer winding wires, the winding directions of two adjacent layers of outer winding wires are opposite to each other.

Preferably, when there are at least two layers of outer winding wires, the size of each layer of outer winding wires is the same.

Preferably, when there are at least two layers of outer winding wires, the size of an outer layer of outer winding wires is greater than the size of an inner layer of outer winding wires.

Preferably, the outer winding wires are coated with a coating capable of promoting adhesion to rubber.

The present invention further provides a tire, including a cable bead, where the cable bead is the cable bead above.

The present invention has the beneficial effects of reducing the arrangement gap and the sizes of the cross section, improving the strength of the cross section, and reducing stress concentration in the bead, thereby prolonging the service life of the bead.

DETAILED DESCRIPTION

Figure 1:
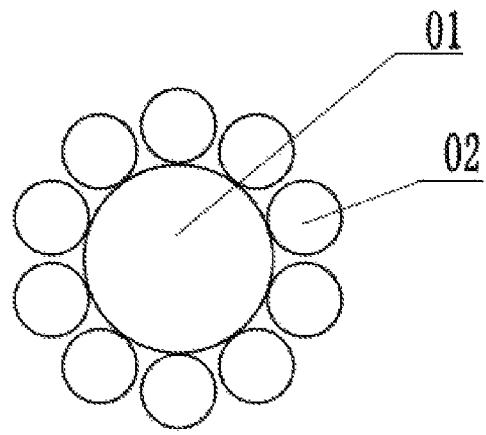
FIG. 1 is a schematic diagram of the cross section of a cable bead of prior art 1.

The present invention is further described below in combination with the accompanying drawings. The following embodiments are merely used for more clearly describing the technical solutions of the present invention, but are not intended to limit the scope of protection of the present invention.

In the present invention, the "flat surface" refers to a surface including two parallel straight edges and two symmetrical arc edges respectively connected to two ends of each of the straight edges. In the direction perpendicular to the straight edges, the distance between the two straight edges is the size of the minor axis of the flat surface, and the line segment corresponding to the size is the minor axis of the flat surface. In the direction parallel to the straight edges, the maximum distance between the two arc edges is the size of the major axis of the flat surface, and the line segment corresponding to the size is the major axis of the flat surface. Based on the shape of the cross section, it can be determined that the outer winding wire is a flat steel wire having two parallel walls extending along a straight line and two symmetrical walls having a radian. Such an outer winding wire may be obtained by drawing a round steel wire with one or more dies for cooperative molding, and may also be obtained by rolling the round steel wire with one or more sets of two-roller rolling mills.

An "S direction" and a "Z direction" are two winding directions opposite to each other.

The diameter of the cross section of the bead is a circumscribed circle diameter of the cross section of the bead.

A total breaking force of the bead is a sum of the breaking forces of the core wire and the outer winding wire.

An effective cross section strength of the bead is a ratio of the total breaking force of the bead to the area of the circumscribed circle of the cross section of the bead.

According to design requirements of the total breaking force of the bead and the size of the cross section, there are generally 1-6 layers of outer winding wires of the bead, and more layers may also be set.

During actual usage of the bead, the stress applied to the outermost layer of steel wires is maximum, and the stress applied to the inner layer of steel wires is relatively small. Therefore, when different specifications of the outer winding wires are selected, selecting the strength of the outer layer of steel wires to be high and the strength of the inner layer of steel wires to be relatively low can obtain a more beneficial design structure.

Measurement of a fatigue breaking retention force is conducted after the bead runs for a predetermined period of time. The tire including the cable bead is mounted and runs for a predetermined period of time, then the bead is taken out of the tire, the breaking force of the steel wire is measured, and the ratio of the breaking force to the initial breaking force thereof is the fatigue breaking retention force. The closer to 1 the fatigue breaking retention force is, the loss of the breaking force is indicated to be smaller, and thus a better service life is achieved.

For the cable bead of prior art 1 as shown in FIG. 1, the specification thereof is 1×φ5.00+(10)×φ2.00, where the core wire 01 is the round steel wire with a diameter of 5.00 mm, and the outer winding wire 02 is the round steel wire with a diameter of 2.00 mm.

Figure 2:
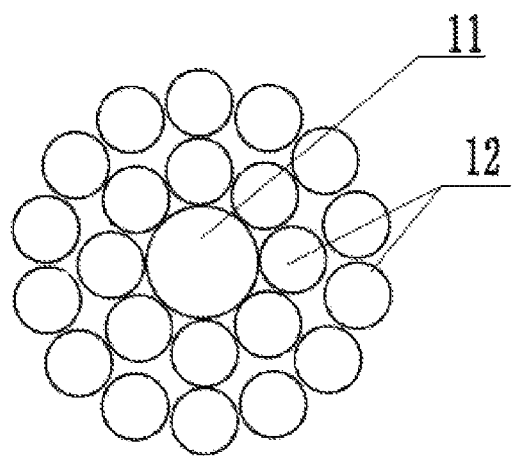
FIG. 2 is a schematic diagram of the cross section of a cable bead of prior art 2.

For the cable bead of prior art 2 as shown in FIG. 2, the specification thereof is 1×φ3.00+(8+14)×φ1.80, where the core wire 11 is the round steel wire with a diameter of 3.00 mm, and the outer winding wire 12 is the round steel wire with a diameter of 1.80 mm.

Figure 3:
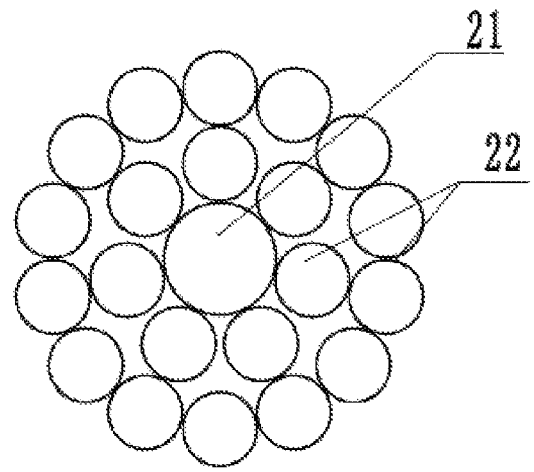
FIG. 3 is a schematic diagram of the cross section of a cable bead of prior art 3.

For the cable bead of prior art 3 as shown in FIG. 3, the specification thereof is 1×φ3.00+(7+14)×φ2.00, where the core wire 21 is the round steel wire with a diameter of 3.00 mm, and the outer winding wire 22 is the round steel wire with a diameter of 2.00 mm.

Embodiment 1

Figure 4:
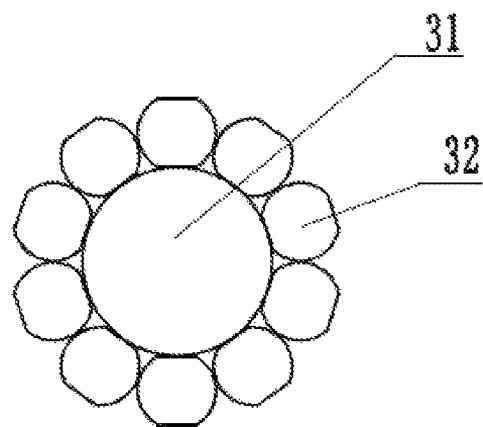
FIG. 4 is a schematic diagram of the cross section of a cable bead of Embodiment 1 in the present invention.

As shown in FIG. 4, a cable bead with the specification of 1×φ5.00+(10)×(2.00×1.80), where the core wire 31 is the round steel wire with a diameter of 5.00 mm; the outer winding wire 32 is the flat steel wire; the size of the major axis thereof is 2.00 mm; the major axis is perpendicular to the radial direction of the cross section of the bead; the size of minor axis thereof is 1.80 mm; and the minor axis is parallel to the radial direction of the cross section of the bead and all extension lines of the minor axes passing through the center of the outer winding wire on the outer winding wire are converged at a point. As shown in Table 1, as compared with prior art 1, for the cable bead in this embodiment, the effective cross section strength is increased by 3.18%, and the fatigue breaking retention force is increased by 4.26%, while the diameter of the cross section of the bead is reduced by 3.78%.

TABLE 1

| Cable bead | Prior art 1 | Embodiment 1 |
| --- | --- | --- |
| Bead ring structure | 1 + 10 | 1 + 10 |
| Core wire specification | Φ5.00 mm | Φ5.00 mm |
| Specification of the outer winding wire | Φ2.00 mm | 2.00 × 1.80 mm |
| Winding direction of the outer winding wire | S | S |
| Bead cross section diameter | 9.00 mm | 8.66 mm |
| Total breaking force | 70.0 KN | 69.4 KN |
| Effective cross section strength | 1100 Mpa | 1135 Mpa |
| Fatigue breaking retention force | 0.94 | 0.98 |

Embodiment 2

Figure 5:
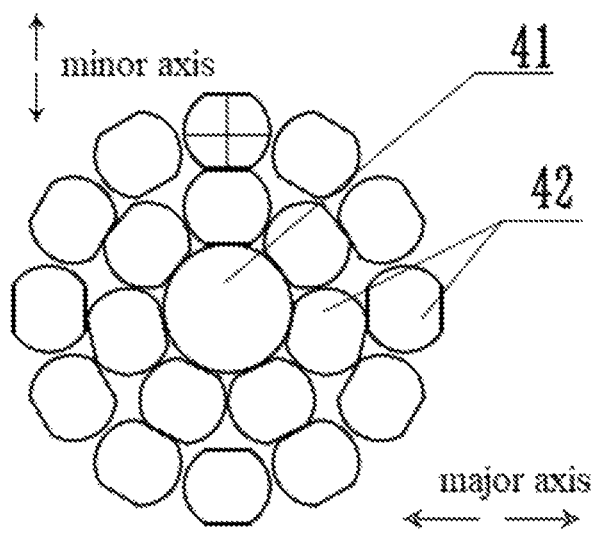
FIG. 5 is a schematic diagram of the cross section of a cable bead of Embodiment 2 in the present invention.
Figure 6:
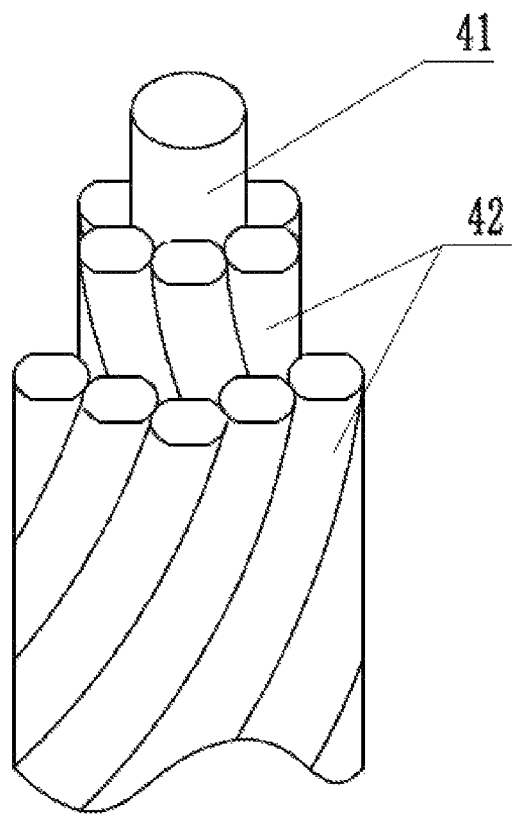
FIG. 6 is a schematic diagram of winding of the cable bead of Embodiment 2 in the present invention.

As shown in FIGS. 5 and 6, a cable bead with the specification of 1×φ3.00+(7+12)×(1.98×1.70), where the core wire 41 is the round steel wire with a diameter of 3.00 mm; the outer winding wire 42 is the flat steel wire; the size of the major axis thereof is 1.98 mm; the major axis is perpendicular to the radial direction of the cross section of the bead; the size of the minor axis thereof is 1.70 mm; and the minor axis is parallel to the radial direction of the cross section of the bead. The winding direction of a first layer of outer winding wires 42 is an S direction, and the winding direction of a second layer of outer winding wires 42 is a Z direction along the radial direction of the cross section of the bead from layer closer to core to layer farther from the core. As shown in Table 2, as compared with prior art 2, for the cable bead in this embodiment, the effective cross section strength is increased by 2.16%, and the fatigue breaking retention force is increased by 7.95%, while the diameter of the cross section of the bead is reduced by 2.64%.

Embodiment 3

The difference from Embodiment 2 is that: the winding direction of the first layer of outer winding wires is the S direction, and the winding direction of the second layer of outer winding wires is the S direction along the radial direction of the cross section of the bead from inside out. As shown in Table 2, as compared with prior art 2, for the cable bead in this embodiment, the effective cross section strength is increased by 2.16%, and the fatigue breaking retention force is increased by 7.95%, while the diameter of the cross section of the bead is reduced by 2.64%.

TABLE 2

| Cable bead | | Prior art 2 | Embodiment 2 | Embodiment 3 |
|---|---|---|---|---|
| Bead ring structure | | 1 + 8 + 14 | 1 + 7 + 12 | 1 + 7 + 12 |
| Core wire specification | | Φ3.00 mm | Φ3.00 mm | Φ3.00 mm |
| Specification of the outer winding wire | First layer | Φ1.80 mm | 1.98 × 1.70 mm | 1.98 × 1.70 mm |
| | Second layer | Φ1.80 mm | 1.98 × 1.70 mm | 1.98 × 1.70 mm |
| Winding direction of the outer winding wire | First layer | S | S | S |
| | Second layer | Z | Z | S |
| Bead cross section diameter | | 10.20 mm | 9.93 mm | 9.93 mm |
| Total breaking force | | 114.0 KN | 110.4 KN | 110.4 KN |
| Effective cross section strength | | 1395 Mpa | 1425 Mpa | 1425 Mpa |
| Fatigue breaking retention force | | 0.88 | 0.95 | 0.95 |

Embodiment 4

Figure 7:
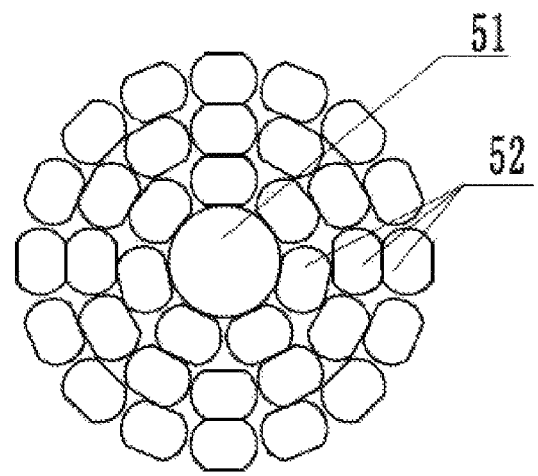
FIG. 7 is a schematic diagram of the cross section of a cable bead of Embodiment 4 in the present invention.

As shown in FIG. 7, a cable bead with the specification of 1×φ3.00+(7+12+16)×(1.75×1.30), where the core wire 51 is the round steel wire with a diameter of 3.00 mm; the outer winding wire 52 is the flat steel wire; the size of the major axis thereof is 1.75 mm; the major axis is perpendicular to the radial direction of the cross section of the bead; the size of the minor axis thereof is 1.30 mm; and the minor axis is parallel to the radial direction of the cross section of the bead. The winding direction of the first layer of outer winding wires 52 is the S direction, the winding direction of the second layer of outer winding wires 52 is the Z direction, and the winding direction of a third layer of outer winding wires 52 is the S direction along the radial direction of the cross section of the bead from inside out. As shown in Table 3, as compared with prior art 3, for the cable bead in this embodiment, the effective cross section strength is increased by 5.45%, and the fatigue breaking retention force is increased by 7.95%.

Embodiment 5

The difference from Embodiment 4 is that: the winding direction of the first layer of outer winding wires is the S direction, the winding direction of the second layer of outer winding wires is the S direction, and the winding direction of the third layer of outer winding wires is the S direction along the radial direction of the cross section of the bead from inside out. As shown in Table 2, as compared with prior art 3, for the cable bead in this embodiment, the effective cross section strength is increased by 5.45%, and the fatigue breaking retention force is increased by 7.95%.

Embodiment 6

Figure 8:
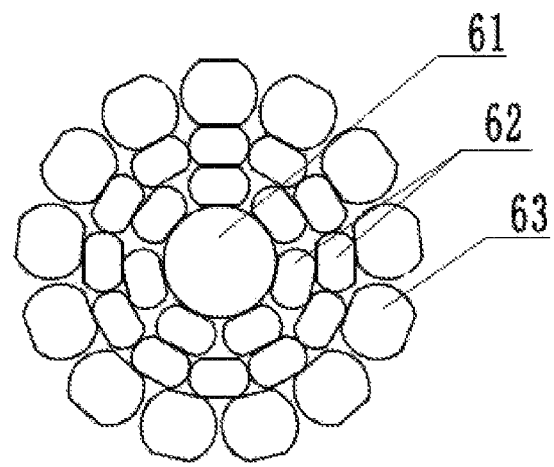
FIG. 8 is a schematic diagram of the cross section of a cable bead of Embodiment 6 in the present invention.

As shown in FIG. 8, a cable bead with the specification of 1× φ3.00+(7+12)×(1.55×1.00)+(13)×(1.98×1.70), where the core wire 61 is the round steel wire with a diameter of 3.00 mm; the outer winding wires 62 and 63 are the flat steel wires; along the radial direction of the cross section of the bead, from inside out, the sizes of the major axes of the first layer of outer winding wires 62 and the second layer of outer winding wires 62 are both 1.55 mm; the major axes are perpendicular to the radial direction of the cross section of the bead; the sizes of the minor axes thereof are both 1.00 mm; the minor axes are parallel to the radial direction of the cross section of the bead; the size of the major axis of the third layer of outer winding wires 63 is 1.98 mm; the major axis is perpendicular to the radial direction of the cross section of the bead; the size of the minor axis thereof is 1.70 mm; and the minor axis is parallel to the radial direction of the cross section of the bead. The winding direction of the first layer of outer winding wires 62 is the S direction, the winding direction of the second layer of outer winding wires 62 is the S direction, and the winding direction of the third layer of outer winding wires 63 is the Z direction. As compared with prior art 3, for the cable bead in this embodiment, the effective cross section strength is increased by 2.41%, and the fatigue breaking retention force is increased by 9.09%, while the diameter of the cross section of the bead is reduced by 3.45%.

TABLE 3

| Cable bead | | Prior art 3 | Embodiment 4 | Embodiment 5 | Embodiment 6 |
|---|---|---|---|---|---|
| Bead ring structure | | 1 + 7 + 14 | 1 + 7 + 12 + 16 | 1 + 7 + 12 + 16 | 1 + 7 + 12 + 13 |
| Core wire specification | | Φ3.00 mm | Φ3.00 mm | Φ3.00 mm | Φ3.00 mm |
| Specification of the outer winding wire | First layer | Φ2.00 mm | 1.75 × 1.30 mm | 1.75 × 1.30 mm | 1.55 × 1.00 mm |
| | Second layer | Φ2.00 mm | 1.75 × 1.30 mm | 1.75 × 1.30 mm | 1.55 × 1.00 mm |
| | Third layer | / | 1.75 × 1.30 mm | 1.75 × 1.30 mm | 1.98 × 1.70 mm |
| Winding direction of the outer winding wire | First layer | S | S | S | S |
| | Second layer | Z | Z | S | S |
| | Third layer | / | S | S | Z |

TABLE 3-continued

| Cable bead | Prior art 3 | Embodiment 4 | Embodiment 5 | Embodiment 6 |
|---|---|---|---|---|
| Bead cross section diameter | 11.00 mm | 11.00 mm | 11.00 mm | 10.62 mm |
| Total breaking force | 134.2 KN | 141.5 KN | 141.5 KN | 128.4 KN |
| Effective cross section strength | 1412 Mpa | 1489 Mpa | 1489 Mpa | 1446 Mpa |
| Fatigue breaking retention force | 0.88 | 0.95 | 0.95 | 0.96 |

Embodiment 7

A cable bead with the specification of 1× φ6.50+(8+11)×(3.00×1.50), where the core wire is the round steel wire with a diameter of 6.50 mm; the outer winding wire is the flat steel wire; the size of the major axis thereof is 3.00 mm; the major axis is perpendicular to the radial direction of the cross section of the bead; the size of the minor axis thereof is 1.50 mm; the minor axis is parallel to the radial direction of the cross section of the bead; and the ratio of the major axis to the minor axis is 2. As shown in Table 4, as compared with prior art 4, for the cable bead in this embodiment, the effective cross section strength is increased by 1.81%, and the fatigue breaking retention force is increased by 2.13%.

TABLE 4

| Cable bead | | Prior art 4 | Embodiment 7 |
|---|---|---|---|
| Bead ring structure | | 1 + 9 | 1 + 8 + 11 |
| Core wire specification | | Φ6.50 mm | Φ6.50 mm |
| Specification of the outer winding wire | First layer | Φ3.00 mm | 3.00 × 1.50 mm |
| | Second layer | / | 3.00 × 1.50 mm |
| Winding direction of the outer winding wire | First layer | S | S |
| | Second layer | / | Z |
| Bead cross section diameter | | 12.50 mm | 12.71 mm |
| Total breaking force | | 120.0 KN | 126.5 KN |
| Effective cross section strength | | 979 Mpa | 997 Mpa |
| Fatigue breaking retention force | | 0.94 | 0.96 |

Embodiment 8

A cable bead with the specification of 1×φ5.00+(8+11+15)×(2.50×1.39), where the core wire is the round steel wire with a diameter of 5.00 mm; the outer winding wire is the flat steel wire; the size of the major axis thereof is 2.50 mm; the major axis is perpendicular to the radial direction of the cross section of the bead; the size of the minor axis thereof is 1.39 mm; the minor axis is parallel to the radial direction of the cross section of the bead; and the ratio of the major axis to the minor axis is 1.8. As shown in Table 5, as compared with prior art 5, for the cable bead in this embodiment, the effective cross section strength is increased by 2.67%, and the fatigue breaking retention force is increased by 6.67%, while the diameter of the cross section of the bead is reduced by 2.03%.

TABLE 5

| Cable bead | | Prior art 5 | Embodiment 8 |
|---|---|---|---|
| Bead ring structure | | 1 + 10 + 16 | 1 + 8 + 11 + 15 |
| Core wire specification | | Φ5.00 mm | Φ5.00 mm |
| Specification of the outer winding wire | First layer | Φ2.20 mm | 2.50 × 1.39 mm |
| | Second layer | Φ2.20 mm | 2.50 × 1.39 mm |
| | Third layer | / | 2.50 × 1.39 mm |
| Winding direction of the outer winding wire | First layer | S | S |
| | Second layer | Z | Z |
| | Third layer | / | S |
| Bead cross section diameter | | 13.80 mm | 13.52 mm |
| Total breaking force | | 197.8 KN | 194.9 KN |
| Effective cross section strength | | 1322 Mpa | 1358 Mpa |
| Fatigue breaking retention force | | 0.90 | 0.96 |

Embodiment 9

A cable bead with the specification of 1×φ2.15+(7)×(1.50×1.36), where the core wire is the round steel wire with a diameter of 2.15 mm; the outer winding wire is the flat steel wire; the size of the major axis thereof is 1.50 mm; the major axis is perpendicular to the radial direction of the cross section of the bead; the size of the minor axis thereof is 1.36 mm; the minor axis is parallel to the radial direction of the cross section of the bead; and the ratio of the major axis to the minor axis is 1.1. As shown in Table 6, as compared with prior art 6, for the cable bead in this embodiment, the effective cross section strength is increased by 1.27%, and the fatigue breaking retention force is increased by 2.13%, while the diameter of the cross section of the bead is reduced by 4.66%.

Embodiment 10

A cable bead with the specification of 1× φ2.15+(11+16)×(0.80×0.72), where the core wire is the round steel wire with a diameter of 2.15 mm; the outer winding wire is the flat steel wire; the size of the major axis thereof is 0.80 mm; the major axis is perpendicular to the radial direction of the cross section of the bead; the size of the minor axis thereof is 0.72 mm; the minor axis is parallel to the radial direction of the cross section of the bead; and the ratio of the major axis to the minor axis is 1.1. As shown in Table 6, as compared with prior art 6, for the cable bead in this embodiment, the effective cross section strength is increased by 9.63%, and the fatigue breaking retention force is increased by 3.19%, while the diameter of the cross section of the bead is reduced by 1.55%.

TABLE 6

| Cable bead | | Prior art 6 | Embodiment 9 | Embodiment 10 |
| --- | --- | --- | --- | --- |
| Bead ring structure | | 1 + 7 | 1 + 7 | 1 + 11 + 16 |
| Core wire specification | | Φ2.15 mm | Φ2.15 mm | Φ2.15 mm |
| Specification of the outer winding wire | First layer | Φ1.50 mm | 1.50 × 1.36 mm | 0.80 × 0.72 mm |
| | Second layer | / | / | 0.80 × 0.72 mm |
| Winding direction of the outer winding wire | First layer | S | S | S |
| | Second layer | / | / | Z |
| Bead cross section diameter | | 5.15 mm | 4.91 mm | 5.07 mm |
| Total breaking force | | 30.8 KN | 28.4 KN | 32.7 KN |
| Effective cross section strength | | 1479 Mpa | 1497 Mpa | 1620 Mpa |
| Fatigue breaking retention force | | 0.94 | 0.96 | 0.97 |

For the cable bead in the present invention, the surface of the outer winding wire has a copper layer, a zinc layer, a brass layer, a silane coupling agent, or other coatings capable of promoting adhesion to rubber, so as to improve the adhesion between the bead and the rubber.

The cable bead obtained in the above manner can be widely applied to all kinds of tires, such as motorcycle tires, car tires, pickup truck tires, and light truck and heavy truck tires, and can also be tires for agricultural machinery and engineering machinery, or even aircraft tires.

It should be noted that the major axis is perpendicular to the radial direction of the cross section of the bead, and the minor axis is parallel to the radial direction of the cross section of the bead, but a slight deviation may occur during actual manufacturing, and should be considered as the setting modes with the design intent of being perpendicular and parallel.

What is claimed is:

1. A cable bead, comprising a core wire located at the middle position of the bead and at least one layer of outer winding wires wound around the core wire, each layer of the outer winding wires being evenly wound along a circumferential direction of the core wire, wherein
    a cross section of each individual outer winding wire in the at least one layer of outer winding wires is a flat surface having a major axis and a minor axis;
    the major axis is perpendicular to a radial direction of a cross section of the bead, and the minor axis is parallel to the radial direction of the cross section of the bead;
    the at least one layer of outer winding wires is in surface contact with the core wire;
    wherein the at least one layer of outer winding wires are at least two layers of outer winding wires, a line contact is formed between the at least two layers of outer winding wires,
    a ratio Rax of the major axis to the minor axis is 1<Rax<2.

2. The cable bead according to claim 1, wherein the ratio Rax of the major axis to the minor axis is 1.1<Rax<1.8.

3. The cable bead according to claim 2, wherein the major axis is 0.80-3.00 mm.

4. The cable bead according to claim 1, wherein the major axis is 0.80-3.00 mm.

5. The cable bead according to claim 4, wherein the major axis is 1.50-2.50 mm.

6. The cable bead according to claim 1, wherein a winding direction of each layer of the at least two layers of outer winding wires is the same.

7. The cable bead according to claim 1, wherein winding directions of two adjacent layers of the at least two layers of outer winding wires are opposite to each other.

8. The cable bead according to claim 1, wherein a size of each layer of the at least two layers of outer winding wires is the same.

9. The cable bead according to claim 1, wherein a size of an outer layer of outer winding wires is greater than a size of an inner layer of outer winding wires.

10. The cable bead according to claim 1, wherein the at least one layer of outer winding wires are coated with a coating capable of promoting adhesion to rubber.

11. A tire, comprising the cable bead according to claim 1.

* * * * *